United States Patent
Yamauchi et al.

(10) Patent No.: US 10,055,404 B2
(45) Date of Patent: Aug. 21, 2018

(54) TRANSLATION APPARATUS

(71) Applicant: Panasonic Intellectual Property Management Co., Ltd., Osaka (JP)

(72) Inventors: Masaki Yamauchi, Osaka (JP); Nanami Fujiwara, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/391,354

(22) Filed: Dec. 27, 2016

(65) Prior Publication Data

US 2017/0220562 A1    Aug. 3, 2017

(30) Foreign Application Priority Data

Jan. 29, 2016  (JP) .................................. 2016-016025

(51) Int. Cl.
G06F 17/28 (2006.01)
G06F 17/27 (2006.01)

(52) U.S. Cl.
CPC ...... *G06F 17/2863* (2013.01); *G06F 17/2775* (2013.01); *G06F 17/2827* (2013.01); *G06F 17/2854* (2013.01)

(58) Field of Classification Search
None
See application file for complete search history.

(56) References Cited

U.S. PATENT DOCUMENTS

| | | | | |
|---|---|---|---|---|
| 2003/0191626 A1* | 10/2003 | Al-Onaizan | ........ | G06F 17/2223 704/8 |
| 2005/0192802 A1* | 9/2005 | Robinson | ........... | G06K 9/00872 704/240 |
| 2007/0150278 A1* | 6/2007 | Bates | .................... | G10L 15/197 704/257 |
| 2007/0203688 A1* | 8/2007 | Fuji | ......................... | G06F 17/28 704/2 |
| 2008/0109209 A1* | 5/2008 | Fraser | ................. | G06F 17/2827 704/4 |
| 2008/0262828 A1* | 10/2008 | Och | .................... | G06F 17/2818 704/3 |
| 2009/0326917 A1* | 12/2009 | Hegenberger | ...... | G06F 17/2827 704/7 |

(Continued)

FOREIGN PATENT DOCUMENTS

JP  2010-061645  3/2010

*Primary Examiner* — Richemond Dorvil
*Assistant Examiner* — Thuykhanh Le
(74) *Attorney, Agent, or Firm* — Greenblum & Bernstein, P.L.C.

(57) ABSTRACT

Provided is a method of managing a server having stored thereon a phrase table containing phrase pairs each being a pair of a phrase in a first language and a phrase in a second language different from the first language. In the method, a processor receives combinations of the phrase pairs used to generate respective candidate target texts which are generated by translation of a source text in the first language into a target text in the second language as candidates for the target text in the second language, and records combination information (for example, a data structure and paths) in the server, the combination information identifying, in the phrase pairs contained in the phrase table, the combinations of the phrase pairs used to generate the respective candidate target texts.

11 Claims, 12 Drawing Sheets

(56) References Cited

U.S. PATENT DOCUMENTS

| | | | |
|---|---|---|---|
| 2010/0004919 A1* | 1/2010 | Macherey | G06F 17/2818 704/4 |
| 2010/0057438 A1* | 3/2010 | Zhanyi | G06F 17/2827 704/4 |
| 2011/0131033 A1* | 6/2011 | Ylonen | G06F 17/27 704/9 |
| 2012/0143593 A1* | 6/2012 | Wu | G06F 17/2836 704/2 |
| 2013/0110498 A1* | 5/2013 | Bekkerman | G06F 17/2745 704/9 |
| 2014/0200878 A1* | 7/2014 | Mylonakis | G06F 17/2818 704/4 |
| 2014/0207439 A1* | 7/2014 | Venkatapathy | G06F 17/2836 704/4 |
| 2014/0288913 A1* | 9/2014 | Shen | G06F 17/289 704/2 |
| 2014/0303961 A1* | 10/2014 | Leydon | G06F 17/28 704/2 |
| 2014/0365201 A1* | 12/2014 | Gao | G06F 17/2818 704/2 |
| 2015/0154183 A1* | 6/2015 | Kristjansson | G06F 17/289 704/3 |
| 2016/0123618 A1* | 5/2016 | Hester | F24F 11/006 700/276 |
| 2016/0124944 A1* | 5/2016 | Andreoli | G06F 17/2854 704/2 |
| 2016/0132590 A1* | 5/2016 | Byron | G06F 17/30675 707/734 |
| 2016/0140111 A1* | 5/2016 | Mirkin | G06F 17/289 704/2 |
| 2016/0314791 A1* | 10/2016 | Wang | G06F 3/167 |
| 2016/0364384 A1* | 12/2016 | Nakagiri | G06F 17/2223 |
| 2017/0061528 A1* | 3/2017 | Arora | G06Q 30/08 |
| 2017/0169493 A1* | 6/2017 | Florance | G06Q 30/0625 |

* cited by examiner

| | FIELD 1 | FIELD 2 | FIELD 3 | FIELD 4 | FIELD 5 | FIELD 6 |
|---|---|---|---|---|---|---|
| PHRASE PAIR 1 | あれ | this　EF4 | 0.2 | ... | ... | ... |
| PHRASE PAIR 2 | あれ　JF1 | that　EF1 | 0.8 | ... | ... | ... |
| PHRASE PAIR 3 | あれは　JF1 | that was　EF2 | 0.1 | ... | ... | ... |
| PHRASE PAIR 4 | あれは　JF1 | that is　EF3 | 0.7 | ... | ... | ... |
| PHRASE PAIR 5 | あれは | this is | 0.2 | ... | ... | ... |
| PHRASE PAIR 6 | あれはペン | that pen | 1 | ... | ... | ... |
| PHRASE PAIR 7 | は | (null) | 0.8 | ... | ... | ... |
| PHRASE PAIR 8 | は | is　EF5 | 0.2 | ... | ... | ... |
| PHRASE PAIR 9 | はペン | was a pencil | 0.65 | ... | ... | ... |
| PHRASE PAIR 10 | はペン | is a pen | 0.35 | ... | ... | ... |
| PHRASE PAIR 11 | ペン | a pen | 0.7 | ... | ... | ... |
| PHRASE PAIR 12 | ペン | pencils | 0.25 | ... | ... | ... |
| PHRASE PAIR 13 | ペン | was a pencil | 0.05 | ... | ... | ... |
| PHRASE PAIR 14 | ペンです | is a pencil | 0.65 | ... | ... | ... |
| PHRASE PAIR 15 | ペンです | is a pen | 0.35 | ... | ... | ... |
| PHRASE PAIR 16 | です | (null) | 1 | ... | ... | ... |
| ⋮ | ⋮ | ⋮ | ⋮ | ⋮ | ⋮ | ⋮ |

FIG. 8

| SOURCE TEXT | | CUMULATIVE PROBABILITY | n-best RANK | CANDIDATE TARGET TEXT | |
|---|---|---|---|---|---|
| あれはペンです OS | COMBINATION 1 | 0.112 | | this a pen | ←TS4 |
| | COMBINATION 2 | 0.448 | 4 | that a pen | ←TS5 |
| | COMBINATION 3 | 0.160 | | that pencils | |
| | COMBINATION 4 | 0.032 | | that was a pencil | |
| | COMBINATION 5 | 0.416 | 5 | that is a pencil | ←TS6 |
| | COMBINATION 6 | 0.224 | | that is a pen | |
| | COMBINATION 7 | 0.520 | 1 | that was a pencil | ←TS7 |
| | COMBINATION 8 | 0.280 | | that is a pen | |
| | COMBINATION 9 | 0.490 | 2 | that is a pen | ←TS8 |
| | COMBINATION 10 | 0.455 | 3 | that is is a pencil | ←TS9 |
| | ⋮ | ⋮ | ⋮ | ⋮ | |

TRANSLATION APPARATUS

BACKGROUND

1. Technical Field

The present disclosure relates to a technique for assisting machine translation using a phrase table.

2. Description of the Related Art

Statistical machine translation is one of machine translation methods. For example, Japanese Unexamined Patent Application Publication No. 2010-61645 discloses a phrase-based statistical machine translation method including a step of performing fuzzy matching on each phrase in an inputted text against a phrase table created beforehand.

In the technique disclosed in Japanese Unexamined Patent Application Publication No. 2010-61645, however, further improvements in translation accuracy are demanded.

SUMMARY

In one general aspect, the techniques disclosed here feature a method of managing a server having a phrase table stored thereon, the phrase table containing phrase pairs each being a pair of a phrase in a first language and a phrase in a second language different from the first language, the method comprising: by a processor, receiving combinations of the phrase pairs used to generate a plurality of respective candidate target texts which are generated by translation of a source text in the first language into a target text in the second language as candidates for the target text in the second language; and by the processor, recording combination information in the server, the combination information identifying, in the phrase pairs contained in the phrase table, the combinations of the phrase pairs used to generate the respective candidate target texts.

The above aspect enables further improvements.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a diagram illustrating a specific example of a phrase table;

FIG. 8 is a diagram illustrating an example of translation result information;

DETAILED DESCRIPTION

The following embodiment provides one specific example of the present disclosure. Numerical values, constituent elements, steps, the order of the steps, and the like are mere examples, and are not intended to limit the present disclosure. In addition, out of the constituent elements described in the following embodiment, ones not described in the independent claims, which represent the broadest concept, are described as optional constituent elements.

(Underlying Knowledge Forming Basis of the Present Disclosure)

Figure 1:
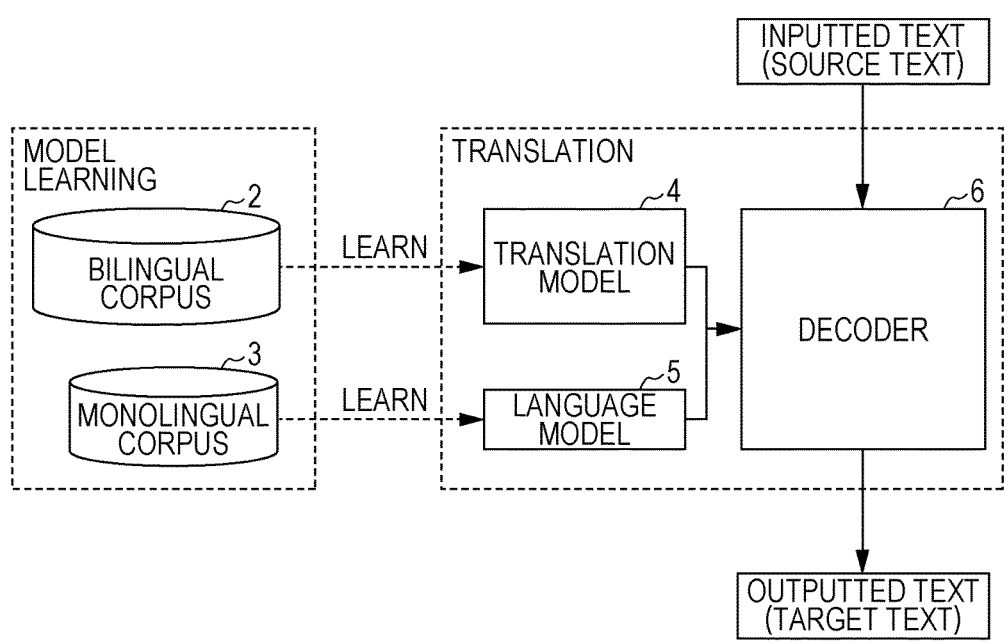
FIG. 1 is a block diagram illustrating a statistical machine translation system applied to one mode according to the present disclosure.

FIG. 1 is a block diagram illustrating a statistical machine translation system 1 applied to one mode according to the present disclosure. The statistical machine translation system 1 includes bilingual corpora 2, monolingual corpora 3, a translation model 4, a language model 5, and a decoder 6. The bilingual corpora 2 is prepared for each region and for each language pair. A region is, for example, a travel region or a medical region. A language pair is a, for example, a pair of Japanese and English or a pair of Japanese and Chinese.

The statistical machine translation system 1 prepares the translation model 4 by learning the bilingual corpora 2 and prepares the language model 5 by learning the monolingual corpora 3. For an inputted text (a source text), the decoder 6 searches combinations of the translation model 4 and the language model 5 for a candidate target text with the largest probability, and generates such a candidate target text as an outputted text (target text). The search for the candidate target text is done by maximum likelihood estimation using the Viterbi algorithm or beam search.

The translation model 4 is managed using a phrase table. The phrase table contains phrase pairs each associated with a score thereof. A phrase pair is a pair of a phrase in a first language and a phrase in a second language. A score is information on the probability of occurrence of a phrase pair associated with the score. A specific example of the phrase table is described below with reference to FIG. 2. In this example, the first language is Japanese, and the second language is English. In a phrase table 7, field 1 contains Japanese phrases, field 2 contains English phrases, field 3 contains phrase-level Japanese-to-English translation probability, field 4 contains the product of word-level Japanese-to-English translation probabilities, field 5 contains phrase-level English-to-Japanese translation probability, and field 6 contains the product of word-level English-to-Japanese translation probabilities. Values in fields 3 to 6 are called scores. A Japanese phrase and an English phrase in the same row form a phrase pair. FIG. 2 illustrates phrase pairs 1 to 16.

An embodiment is described using the phrase-level Japanese-to-English translation probability (field 3) among the scores described above. Thus, values are shown for the phrase-level Japanese-to-English translation probability (field 3), but omitted for the product of word-level Japanese-to-English translation probabilities (field 4), the phrase-level English-to-Japanese translation probability (field 5), and the product of word-level English-to-Japanese translation probabilities (field 6).

The phrase-level Japanese-to-English translation probability (field 3) is specifically described. For instance, the probability of a Japanese phrase JF1 being translated into an English phrase EF1 is 0.1, the probability of the Japanese phrase JF1 being translated into an English phrase EF2 is 0.7, and the probability of the Japanese phrase JF1 being translated into an English phrase EF3 is 0.2. These probabilities add up to 1.

Figure 3:
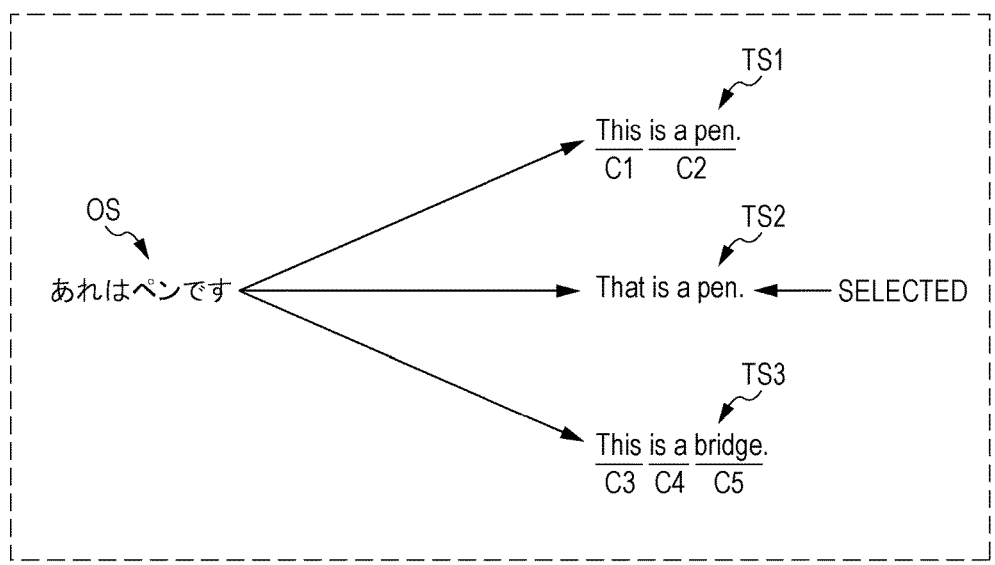
FIG. 3 is a diagram illustrating a source text and three candidate target texts.

In a conceivable mode, the statistical machine translation system 1 presents, to a user, multiple candidate target texts generated by translation of a source text, prompts the user to select the most suitable one of the candidate target texts, and learns from the result. A more specific description is given with reference to FIG. 3 illustrating the relations between a source text OS and three candidate target texts TS1, TS2, and TS3. In this example, the candidate target texts TS1, TS2, and TS3 are generated as candidate target texts for the source text OS.

If the user selects the candidate target text TS2, the statistical machine translation system 1 learns, in the candidate target text TS1, that a segment C1 is a bad segment and a segment C2 is a good segment, and in the candidate target text TS3, that a segment C3 is a bad segment, a segment C4 is a good segment, and a segment C5 is a bad segment.

If the scores in the phrase table 7 are updated based on the learning results thus obtained, the statistical machine translation system 1 improves in translation accuracy.

However, the following problem arises. Specifically, when the statistical machine translation system 1 translates a source text, multiple combinations of phrase pairs are possible for forming the same candidate target text (for instance, the candidate target text TS1), such as, in this example, a combination of phrase pairs 1, 8, 11, and 16, a combination of phrase pairs 1, 7, and 15, and so forth. For this reason, the combination of phrase pairs that form a certain candidate target text cannot be determined based solely on the candidate target text. Thus, the scores in the phrase table 7 cannot be updated using the learning results.

The following improvement measures have been considered to be able to identify which combination of phrase pairs has been used to generate a candidate target text.

One aspect of a method according to the present disclosure provides a method of managing a server having a phrase table stored thereon, the phrase table containing phrase pairs each being a pair of a phrase in a first language and a phrase in a second language different from the first language, the method comprising: by a processor, receiving combinations of the phrase pairs used to generate a plurality of respective candidate target texts which are generated by translation of a source text in the first language into a target text in the second language as candidates for the target text in the second language; and by the processor, recording combination information in the server, the combination information identifying, in the phrase pairs contained in the phrase table, the combinations of the phrase pairs used to generate the respective candidate target texts.

In the one aspect of the method according to the present disclosure, the combination information is recorded in the server to identify, in the phrase pairs contained in the phrase table, the combinations of the phrase pairs used to generate the respective candidate target texts. Thus, according to the method of the one aspect, the combinations of the phrase pairs used to generate the respective candidate target texts are identifiable.

In the foregoing configuration, the recording includes recording, as the combination information, a data structure representing the combinations of the phrase pairs used to generate the respective candidate target texts, and paths along which the respective combinations of the phrase pairs used to generate the respective candidate target texts are obtainable in the data structure.

The foregoing provides an example of the combination information.

In the foregoing configuration, the phrase pairs contained in the phrase table are respectively associated with scores each of which is information on probability of occurrence of the phrase pair associated therewith, and the method comprises: prompting a user to select a most suitable candidate target text from the candidate target texts; using the recorded combination information, identifying the combination of the phrase pairs used to generate the candidate target text not selected in the selecting; and evaluating each of the phrase pairs forming the identified combination so as to adjust the score of the phrase pair.

In this configuration, to perform score adjustment, an evaluation for score adjustment is performed on each of the phrase pairs used to generate the candidate target text not selected in the selecting.

In the foregoing configuration, the evaluating includes comparing each of the phrase pairs forming the identified combination with elements of the selected candidate target text, and determining, based on predetermined criteria, to increase the score of the phrase pair whose score is to be increased, and to decrease the score of the phrase pair whose score is to be decreased.

The foregoing provides one aspect of the evaluating. For example, the elements are morphemes when the candidate target texts are segmented by morphological analysis, and are a subject, a predicator, a complement, an object, and the like, when the candidate target texts are segmented by syntactic analysis. Various criteria are possible as a criterion for determining to increase a score and a criterion for determining to decrease a score. Since it is easy for those skilled in the art to conceive of such criteria, they are described as predetermined criteria herein. In the embodiment to be described later, criteria (1) to (7) are given as the predetermined criteria.

In the foregoing configuration, the method further comprises: performing processing which is at least one of a first process of increasing the score of the phrase pair whose score is determined to be increased and a second process of decreasing the score of the phrase pair whose score is determined to be decreased.

According to this configuration, score adjustment is performed, based on results of the evaluating, on each of the phrase pairs used to generate the candidate target text not selected in the selecting. Thus, improvements in the accuracy of machine translation can be achieved. The method may perform at least one of the first process for increasing the score and the second process for decreasing the score because the accuracy of machine translation is improved not only when both of them are performed, but also when only one of them is performed.

In the foregoing configuration, the method further comprises, when the first process is performed in the processing, setting a first predetermined value for use in the first process according to variability between the score of the phrase pair to be subjected to the first process and the score of another phrase pair containing the same phrase in the first language as the phrase pair to be subjected to the first process, and the performing the processing includes performing the first process using the first predetermined value thus set.

According to this configuration, the first predetermined value for use in the first process is variable according to the variability between the score of the phrase pair to be subjected to the first process and the score of another phrase pair containing the same phrase in the first language as this phrase pair. Thus, compared to a mode where the first predetermined value is a fixed value, the translation accuracy improves even more.

A detailed description is given regarding setting of the first predetermined value. In the setting, the first predetermined value is set so that the score of a certain phrase pair to be subjected to the first process may be changed to a relatively large extent when the variability between the score of the certain phrase pair to be subjected to the first process and the score of another phrase pair containing the same phrase in the first language as the certain phrase pair is relatively large, and changed to a relatively small extent when the aforementioned variability is relatively small. Conversely, the first predetermined value may be set so that the score of a certain phrase pair to be subjected to the first process may be changed to a relatively small extent when the variability between the score of the certain phrase pair to be subjected to the first process and the score of another phrase pair containing the same phrase in the first language as the certain phrase pair is relatively large, and changed to a relatively large extent when the aforementioned variability is relatively small.

In the foregoing configuration, the method further comprises, when the second process is performed in the processing, setting a second predetermined value for use in the second process according to variability between the score of the phrase pair to be subjected to the second process and the score of another phrase pair containing the same phrase in the first language as the phrase pair to be subjected to the second process, and the performing the processing includes performing the second process using the second predetermined value thus set.

According to this configuration, the second predetermined value for use in the second process is variable according to the variability between the score of the phrase pair to be subjected to the second process and the score of another phrase pair containing the same phrase in the first language as this phrase pair. Thus, compared to a mode where the second predetermined value is a fixed value, the translation accuracy improves even more.

A detailed description is given regarding setting of the second predetermined value. In the setting, the second predetermined value is set so that the score of a certain phrase pair to be subjected to the second process may be changed to a relatively large extent when the variability between the score of the certain phrase pair to be subjected to the second process and the score of another phrase pair containing the same phrase in the second language as the certain phrase pair is relatively large, and changed to a relatively small extent when the aforementioned variability is relatively small. Conversely, the second predetermined value may be set so that the score of a certain phrase pair to be subjected to the second process may be changed to a relatively small extent when the variability between the score of the certain phrase pair to be subjected to the second process and the score of another phrase pair containing the same phrase in the second language as the certain phrase pair is relatively large, and changed to a relatively large extent when the aforementioned variability is relatively small.

In the foregoing configuration, the recording includes recording translation-result-related numerical information on the candidate target texts, the translation-result-related numerical information being calculated based on the scores, the method further comprising: retranslating the source text using the phrase table updated by the processing, to generate again a plurality of candidate target texts as candidates for the target text; calculating and generating the numerical information on each of the candidate target texts thus generated again, based on the scores in the phrase table updated by the processing; determining whether a predefined criterion is satisfied or not based on a comparison between the numerical information recorded and the numerical information generated; and performing the performing the processing again when it is determined that the predefined criterion is satisfied.

The translation-result-related numerical information is, for example, n-best ranks. A case where the predefined criterion is satisfied is, for example, a case where there is no change in the ranks when the n-best ranks recorded in the recording are compared with the n-best ranks generated in the retranslating. According to this configuration, the score adjustment is performed again when it is determined, as a result of a comparison between the numerical information recorded in the recording and the numerical information generated in the retranslating, that the predefined criterion is satisfied. Thereby, translation accuracy improves.

One aspect of an apparatus according to the present disclosure provides an apparatus comprising: a recording medium having a phrase table stored thereon, the phrase table containing phrase pairs each being a pair of a phrase in a first language and a phrase in a second language different from the first language; a processor; and a memory having a computer program stored thereon, the computer program causing the processor to execute operations including: receiving combinations of the phrase pairs used to generate a plurality of respective candidate target texts which are generated by translation of a source text in the first language into a target text in the second language as candidates for the target text in the second language; and recording combination information in the recording medium, the combination information identifying, in the phrase pairs contained in the phrase table, the combinations of the phrase pairs used to generate the respective candidate target texts.

The one aspect of the apparatus according to the present disclosure produces advantageous effects similar to those produced by the one aspect of the method according to the present disclosure.

One aspect of an apparatus according to the present disclosure provides an apparatus comprising: a processor; a recording medium having a phrase table stored thereon, the phrase table containing phrase pairs each being a pair of a phrase in a first language and a phrase in a second language different from the first language; a medium having a computer program stored thereon, the computer program causing the processor to execute operations including: for translation of a source text in the first language into a target text in the second language, generating a plurality of candidate target texts as candidates for the target text, by use of the phrase table; and recording combination information in the recording medium, the combination information identifying, in the phrase pairs contained in the phrase table, combinations of the phrase pairs used to generate the respective candidate target texts.

The one aspect of the apparatus according to the present disclosure produces advantageous effects similar to those produced by the one aspect of the method according to the present disclosure.

One aspect of a recording medium according to the present disclosure provides a non-transitory recording medium having a computer program stored thereon, the computer program causing a processor to execute operations comprising: receiving combinations of the phrase pairs used to generate a plurality of respective candidate target texts which are generated by translation of a source text in a first language into a target text in a second language different from the first language as candidates for the target text in the second language; and in a server having stored thereon a phrase table containing phrase pairs each being a pair of a phrase in the first language and a phrase in the second language, recording combination information which identifies, in the phrase pairs contained in the phrase table, the combinations of the phrase pairs used to generate the respective candidate target texts.

The one aspect of the recording medium according to the present disclosure produces advantageous effects similar to those produced by the one aspect of the method according to the present disclosure.

(Embodiment)

Figure 4:
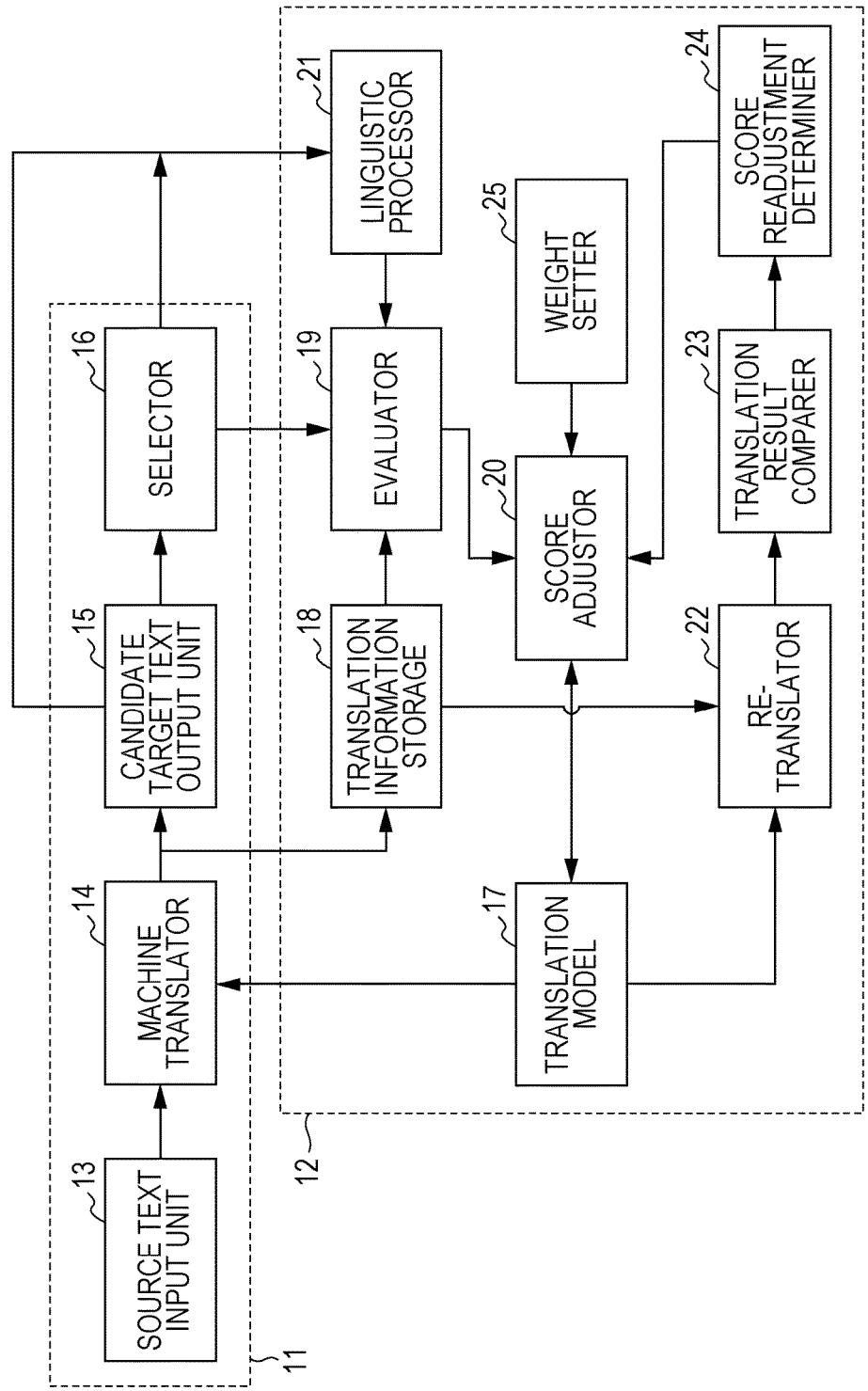
FIG. 4 is a diagram illustrating the functional block of a translation system according to an embodiment.

An embodiment of the present disclosure is described in detail below. Although the first language is Japanese and the second language is English in the following embodiment, the combination of the first language and the second language is not limited to this example. FIG. 4 is a diagram illustrating the functional blocks of a translation system 10 according to the present embodiment. The translation system 10 employs statistical machine translation. The translation system 10 includes a user terminal 11 and a server 12. The translation system 10 includes, as functional blocks, a source text input unit 13, a machine translator 14, a candidate target text output unit 15, a selector 16, a translation model 17, a translation information storage 18, an evaluator 19, a score adjustor 20, a linguistic processor 21, a re-translator 22, a translation result comparer 23, a score readjustment determiner 24, and a weight setter 25.

The source text input unit 13, the machine translator 14, the candidate target text output unit 15, and the selector 16 are included in the user terminal 11. The user terminal 11 is, for example, a desktop personal computer, a laptop personal computer, a smartphone, or a tablet terminal.

The translation model 17, the translation information storage 18, the evaluator 19, the score adjustor 20, the linguistic processor 21, the re-translator 22, the translation result comparer 23, the score readjustment determiner 24, and the weight setter 25 are included in the server 12. The server 12 can communicate with the user terminal 11, and is an example of a translation assisting apparatus. Some of these functional blocks (for example the translation model 17) may be included in the user terminal 11. All of the functional blocks may be included in the user terminal 11. When all of the functional blocks are included in the user terminal 11, the server 12 is unnecessary. Thus, all that is needed is the user terminal 11, and the user terminal 11 serves as a translation apparatus including the translation assisting apparatus.

A description is given of the functional blocks included in the user terminal 11. The source text input unit 13 is used by a user to input a source text. When the source text is inputted using characters, the source text input unit 13 is, for example, a keyboard or a touch panel. When the source text is inputted using voice, the source text input unit 13 is a microphone and a voice recognition device that recognizes voice picked up by the microphone.

The machine translator 14 translates the source text in a first language inputted using the source text input unit 13, and thereby generates candidate target texts in a second language. The candidate target texts are generated using statistical machine translation illustrated in FIG. 1. The machine translator 14 corresponds to the decoder 6 illustrated in FIG. 6, and is implemented by, for example, hardware such as a central processing unit (CPU), a random access memory (RAM), a read-only memory (ROM), and the like, as well as various types of software for executing machine translation.

The candidate target text output unit 15 outputs the candidate target texts generated by the machine translator 14. When the candidate target texts are outputted as characters, the candidate target text output unit 15 is a display. When the candidate target texts are outputted as audio, the candidate target text output unit 15 is a speaker.

The selector 16 is used by a user to select the most suitable candidate target text from the candidate target texts outputted by the candidate target text output unit 15. The selector 16 is, for example, a keyboard or a touch panel. When the most suitable candidate target text is to be selected using voice, the selector 16 is a microphone and a voice recognition device that recognizes voice picked up by the microphone.

Next, a description is given of the functional blocks included in the server 12. These functional blocks are implemented by, for example, hardware such as a CPU, a RAM, a ROM, and the like, as well as various types of software for assisting machine translation.

The translation model 17 corresponds to the translation model 4 illustrated in FIG. 1, and managed using the phrase table 7, the example of which is illustrated in FIG. 2. The machine translator 14 performs statistical machine translation using the translation model 17. Although actual statistical machine translation requires not only the translation model 17 but also the language model 5 (FIG. 1), the present embodiment omits the language model 5 for the purpose of simplifying the description of the translation system 10.

In the translation information storage 18, translation information is recorded. The translation information includes translation result information and combination information. The translation result information includes a source text inputted using the source text input unit 13, candidate target texts generated by the machine translator 14, and other information. The combination information is information identifying combinations of phrase pairs used to generate the respective candidate target texts, among the phrase pairs contained in the phrase table 7. Detailed descriptions of the translation result information and the combination information will be given later.

The score adjustor 20 adjusts the scores in the phrase table 7 with which the translation model 17 is managed, the adjustment being made based on the candidate translate text selected using the selector 16 (that is, the candidate target text determined by the user as being most suitable).

The other functional blocks are described in connection with operations of the translation system 10 described next.

Figure 5:
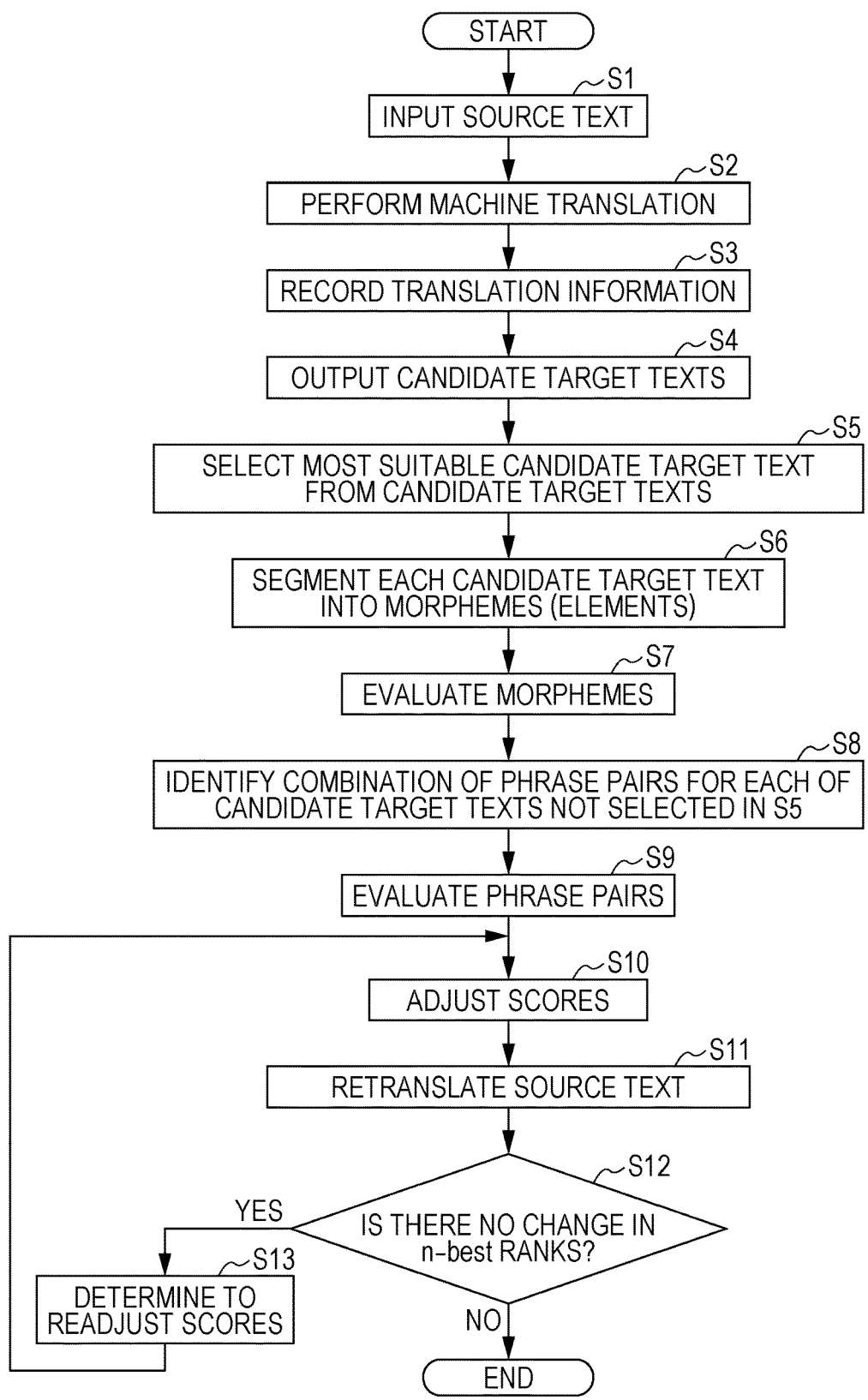
FIG. 5 is a flowchart illustrating operations of the translation system according to the embodiment.

Referring mainly to FIGS. 4 and 5, a description is given of the operations of the translation system 10 according to the present embodiment. FIG. 5 is a flowchart illustrating the operations.

A user inputs a source text using the source text input unit 13 (Step S1). The source text OS illustrated in FIG. 3 is used as an example in the following description.

The machine translator 14 performs statistical machine translation on the source text inputted through the source text input unit 13 (Step S2). To be more specific, using a predetermined method, the machine translator 14 segments the source text inputted in Step S1 through the source text input unit 13. The predetermined method includes morphological analysis, syntactic analysis, and the like. Morphological analysis is used in the following description as an example.

Figure 6:
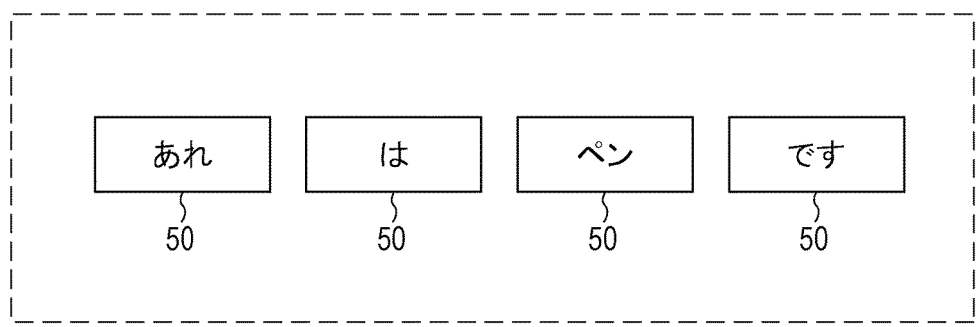
FIG. 6 is a diagram illustrating an example of the source text segmented into morphemes.
Figure 7:
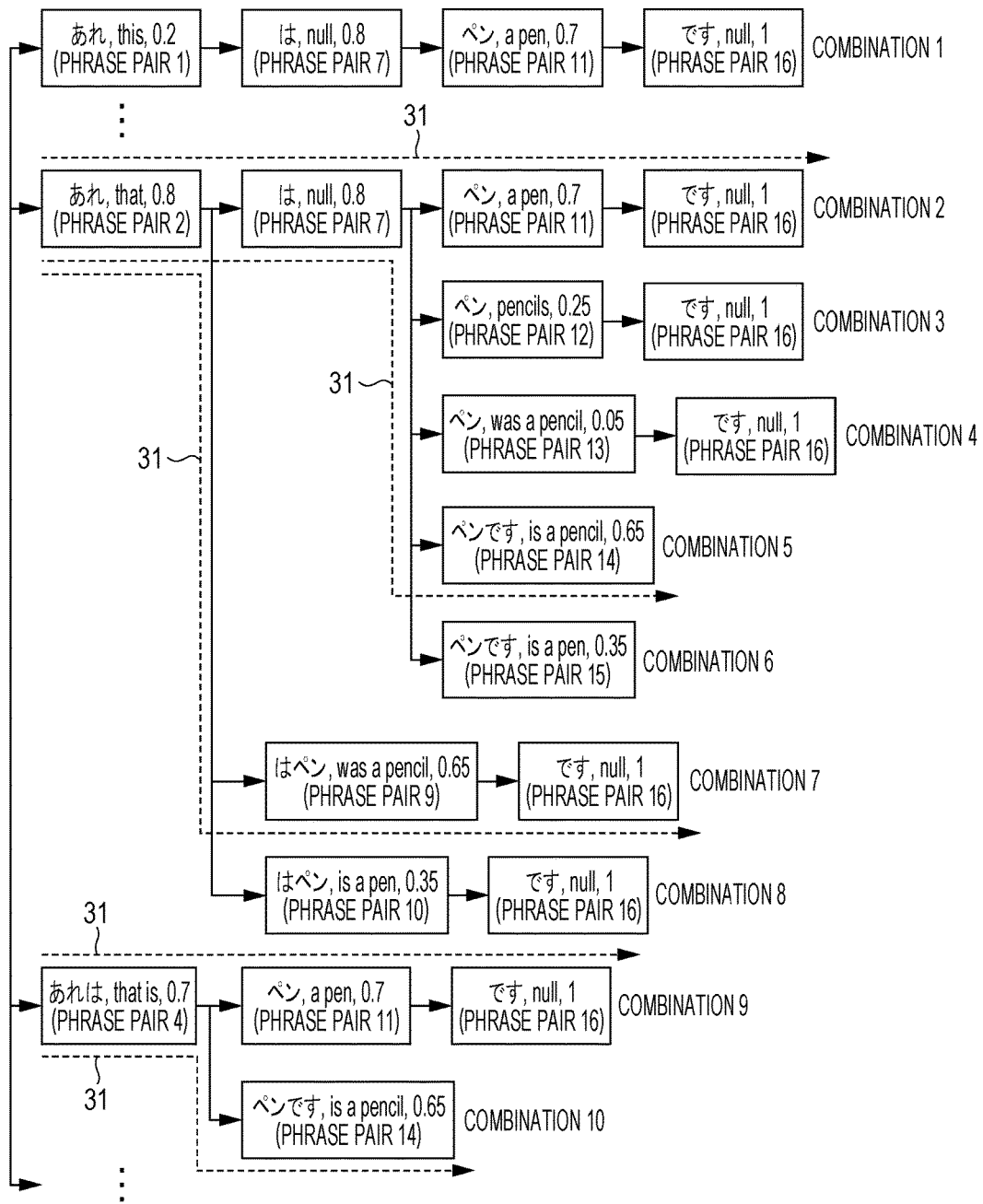
FIG. 7 is a diagram illustrating an example of a data structure generated by a machine translator.

Performing morphological analysis on the source text, the machine translator 14 segments the source text into four morphemes 50 illustrated in FIG. 6. Using these four morphemes 50 and the phrase table 7 (FIG. 2) with which the translation model 17 is managed, the machine translator 14 generates a data structure 30 (FIG. 7) from which all candidate target texts can be obtained. The candidate target texts are candidates for a target text of the source text. FIG. 7 is a diagram illustrating an example of the data structure 30 generated by the machine translator 14.

The data structure 30 has a tree structure, and its nodes are phrase pairs. The phrase pairs in the data structure 30 are, among the phrase pairs contained in the phrase table 7 (FIG. 2), phrase pairs used to generate the candidate target texts. Each phrase pair in the data structure 30 contains a Japanese phrase, an English phrase, and a score. This score is the value shown in field 3 in FIG. 2.

The data structure 30 includes combinations 1 to 10 as combinations of phrase pairs used to generate candidate target texts. For instance, the combination 1 is a combination of the phrase pairs 1, 7, 11, and 16 arranged in this order. A candidate target text generated with the combination 1 is the candidate target text TS4 illustrated in FIG. 8.

The machine translator 14 calculates the cumulative probability of each of the combinations in the data structure 30, and determines n-best ranks.

The machine translator 14 generates translation result information based on the foregoing information. FIG. 8 is a diagram illustrating an example of translation result information 40. The translation result information 40 represents a source text and combinations each associated with its cumulative probability, n-best rank, and candidate target text.

The cumulative probability for a candidate target text is a value obtained by multiplying together the scores (the phrase-level Japanese-to-English translation probabilities in field 3 in FIG. 2) of the phrase pairs used to generate the candidate target text. For the combination 1 for instance, referring to FIGS. 7 and 8, a cumulative probability of 0.112 (=0.2×0.8×0.7×1) is obtained.

The field "n-best rank" represents the ranks of the combination having the highest cumulative probability to the combination having the n-th highest cumulative probability. Although n in the n-best rank is five herein, n is not limited to this example. The machine translator 14 determines the first to fifth ranks, with the combination having the highest cumulative probability being ranked first. In this example, the combination 7 ranks first, the combination 9 ranks second, the combination 10 ranks third, the combination 2 ranks fourth, and the combination 5 ranks fifth.

In the present embodiment, the n-best rank and the cumulative probability constitute translation-result-related numerical information. Alternatively, only the n-best rank may form the translation-result-related numerical information.

The machine translator 14 records translation information onto the translation information storage 18 (Step S3). The translation information is formed by combination information and the translation result information 40 (FIG. 8). The combination information is the data structure 30 (FIG. 7) and paths 31. The paths 31 are paths along which the respective combinations of the first to n-th (fifth herein) n-best ranks are obtainable. In this example, the paths include the path 31 for the combination 2, the path for the combination 5, the path 31 for the combination 7, the path 31 for the combination 9, and the path 31 for the combination 10. The translation result information 40 includes the above-described translation-result-related numerical information (the cumulative probabilities and n-best ranks).

The candidate target text output unit 15 outputs the candidate target texts formed respectively by the combinations of the first to n-th (fifth herein) n-best ranks (Step S4). In this example, the candidate target text TS5, the candidate target text TS6, the candidate target text TS7, the candidate target text TS8, and the candidate target text TS9 in FIG. 8 are outputted. When, for example, the candidate target text output unit 15 is a display of the user terminal 11, these candidate target texts are displayed on the display.

Using the selector 16, the user selects, from the five candidate target texts outputted in Step S4, the candidate target text which is most suitable as the target text for the source text inputted in Step S1 (Step S5). In this example, the candidate target text TS8 in FIG. 8 formed by the combination 9 is selected.

Figure 9:
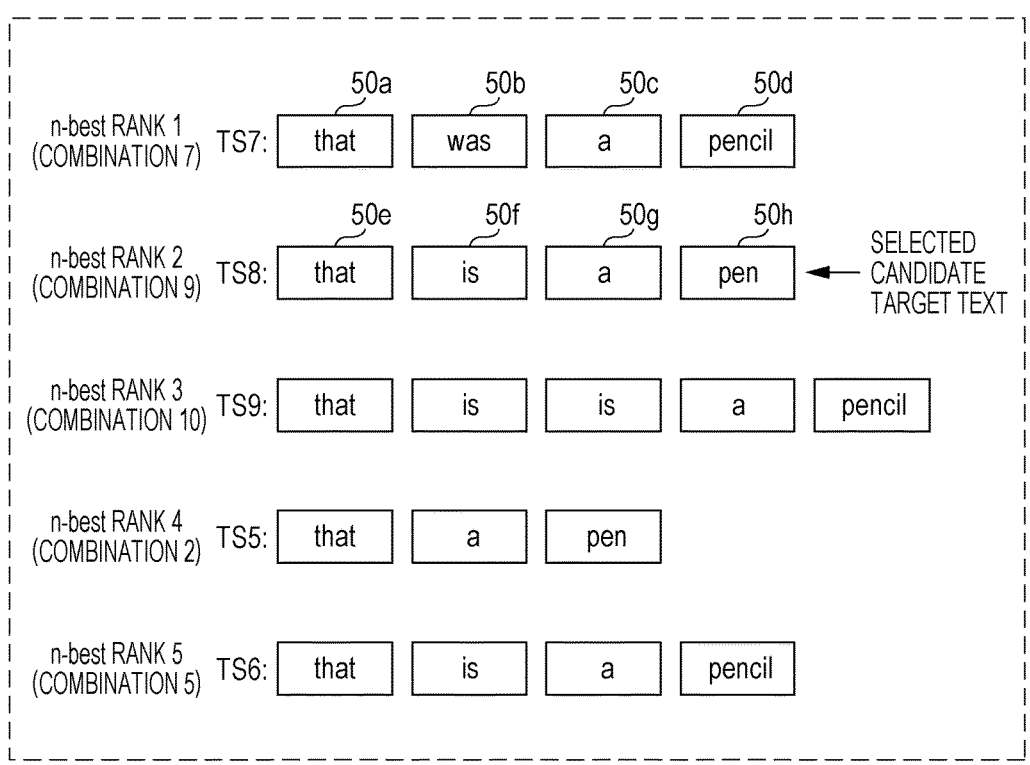
FIG. 9 is a diagram illustrating results of morphological analysis on each of five candidate target texts.

The linguistic processor 21 performs predetermined analysis on the five candidate target texts outputted in Step S4, and thereby segments each candidate target text into multiple elements (Step S6). The predetermined analysis includes morphological analysis, syntactic analysis, and the like. Morphological analysis is used in the following description as an example. In morphological analysis, the elements are morphemes. FIG. 9 is a diagram illustrating results of morphological analysis performed on the five candidate target texts. For instance, the candidate target text TS7 formed by the combination 7 is segmented into four morphemes (elements): a morpheme 50*a*, a morpheme 50*b*, a morpheme 50*c*, and a morpheme 50*d*.

The evaluator 19 evaluates each of the morphemes segmented in Step S6 (Step S7). To be more specific, the evaluator 19 evaluates the morphemes of each of the candidate target texts not selected in Step S5 such that: the same morpheme as any of a morpheme 50*e*, a morpheme 50*f*, a morpheme 50*g*, and a morpheme 50*h* of the candidate target text TS8 selected in Step S5 is a good morpheme; a morpheme different from any of the above morphemes 50*e* to 50*h* is a bad morpheme; and a morpheme not evaluable as a good morpheme or a bad morpheme is a neutral morpheme.

Figure 10:
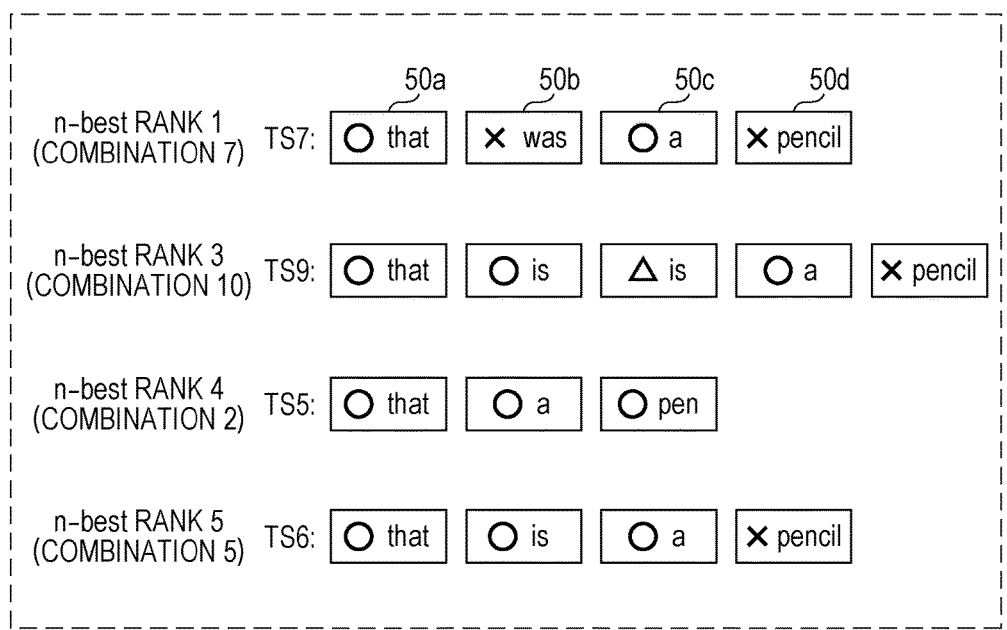
FIG. 10 is a diagram illustrating results of evaluation of morphemes.

FIG. 10 is a diagram illustrating results of the evaluation of the morphemes. A good morpheme is indicated by a circle (○), a bad morpheme is indicated by a cross mark (×), and a neutral morpheme is indicated by a triangle (Δ). For instance, for the candidate target text TS7 formed by the combination 7, the morpheme 50*a* is evaluated as a good morpheme, the morpheme 50*b* is evaluated as a bad morpheme, the morpheme 50*c* is evaluated as a good morpheme, and the morpheme 50*d* is evaluated as a bad morpheme.

For each of the candidate target texts not selected in S5, the evaluator 19 identifies the combination of phrase pairs used to generate the candidate target text (Step S8). The combination information contained in the translation information recorded in Step S3 is used for this identification. The combination information is, as described earlier, formed by the data structure 30 and the paths 31 along which the combinations at the first to fifth n-best ranks are respectively obtainable.

The evaluator 19 searches the data structure 30 using the path 31 for obtaining the combination 7 and thereby obtains the phrase pairs 2, 9, and 16. The evaluator 19 searches the data structure 30 using the path 31 for obtaining the combination 10 and thereby obtains the phrase pairs 4 and 14. The evaluator 19 searches the data structure 30 using the path 31 for obtaining the combination 2 and thereby obtains the phrase pairs 2, 7, 11, and 16. The evaluator 19 searches the data structure 30 using the path 31 for obtaining the combination 5 and thereby obtains the phrase pairs 2, 7, and 14.

Figure 11:
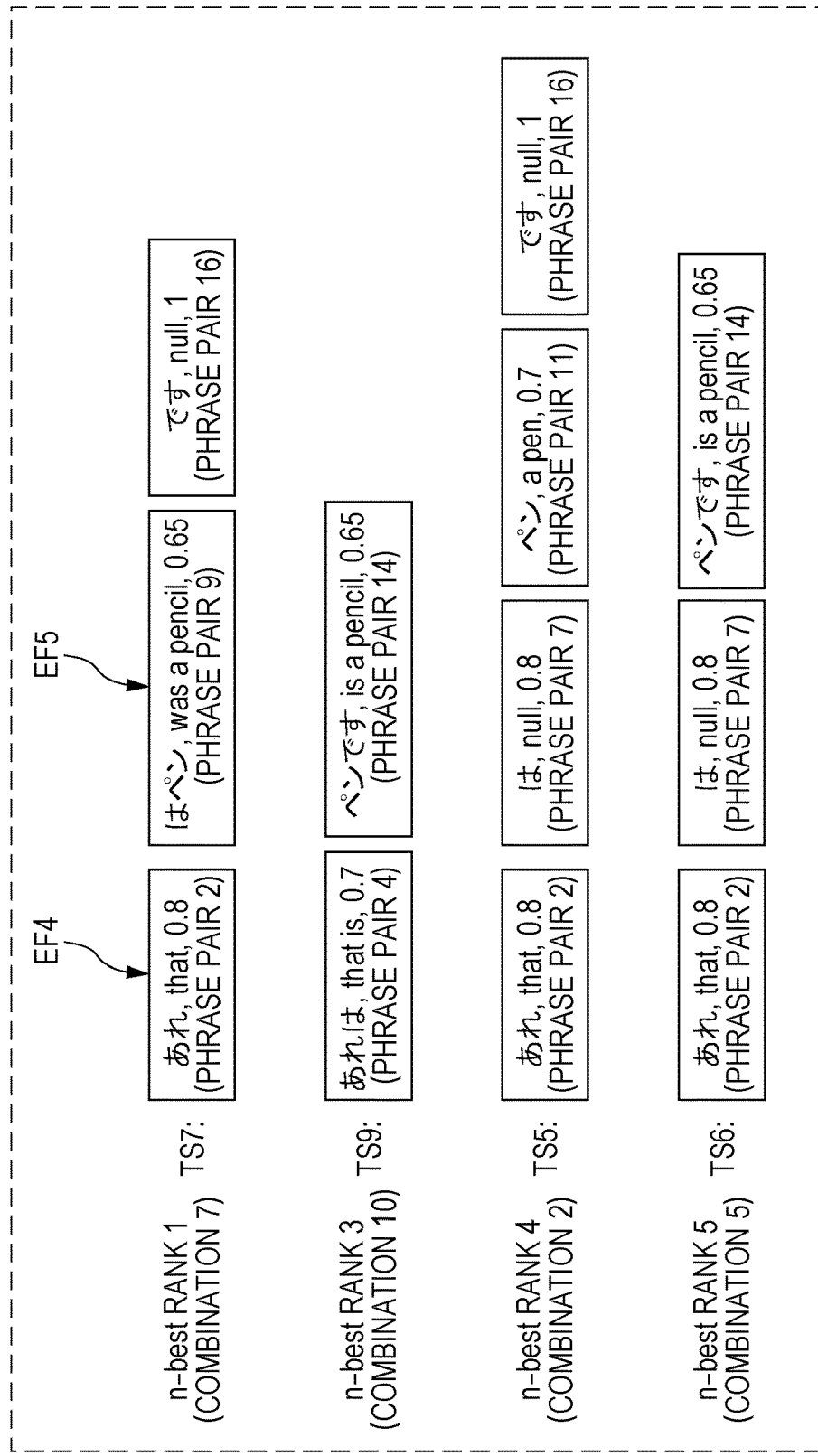
FIG. 11 is a diagram illustrating combinations of phrase pairs found by an evaluator.

FIG. 11 is a diagram illustrating the combinations of phrase pairs found by the evaluator 19. The combination 7 is a combination of the phrase pairs 2, 9, and 16. The combination 10 is a combination of the phrase pairs 4 and 14. The combination 2 is a combination of the phrase pairs 2, 7, 11, and 16. The combination 5 is a combination of the phrase pairs 2, 7, and 14.

The evaluator 19 then evaluates each phrase pair illustrated in FIG. 11 with respect to adjustment of the score of the phrase pair (for instance, the score of the phrase pair 2 is 0.8) (Step S9). Specifically, the phrase pairs are evaluated as follows. The evaluator 19 compares each of the phrase pairs shown in FIG. 11 (namely, the phrase pairs forming the combinations identified in Step S8) with the morphemes (elements) contained in the candidate text target selected in Step S5, and thereby determines to increase the score of the phrase pair whose score is to be increased, and to decrease the score of the phrase pair whose score is to be decreased.

In the present embodiment, a phrase pair is a good phrase pair when determined that its score is to be increased, a phrase pair is a bad phrase pair when determined that its score is to be decreased, and a phrase pair is a neutral phrase pair when not evaluable as a good phrase pair or a bad phrase pair. The criteria for the evaluation of a good, bad, or neutral phrase pair are, for example, as follows:

(1) When an English phrase in a phrase pair consists only of good morphemes, the phrase pair is evaluated as a good phrase pair.

(2) When an English phrase in a phrase pair consists only of bad morphemes, the phrase pair is evaluated as a bad phrase pair.

(3) When there is no English phrase in a phrase pair (for instance, the phrase pair 16 in FIG. 11), the phrase pair is evaluated as a neutral phrase pair.

(4) When an English phrase in a phrase pair consists of a good morpheme(s) and a neutral morpheme(s), the phrase pair is evaluated as a good phrase pair. Such a phrase pair may also be evaluated as a neutral phrase pair.

(5) When an English phrase in a phrase pair consists of a bad morpheme(s) and a neutral morpheme(s), the phrase pair is evaluated as a bad phrase pair. Such a phrase pair may also be evaluated as a neutral phrase pair.

(6) When an English phrase in a phrase pair consists of a good morpheme(s) and a bad morpheme(s), or consists of a good morpheme(s), a bad morpheme(s), and a neutral morpheme(s), the phrase pair is evaluated as a bad phrase pair. Such a phrase pair may also be evaluated as a good phrase pair. Alternatively, such a phrase pair may be evaluated as a good phrase pair when there are more good morphemes than bad morphemes, or evaluated as a bad phrase pair when there are more bad morphemes than good morphemes.

(7) When an English phrase in a phrase pair consists only of a neutral morpheme, the phrase pair is evaluated as a neutral phrase pair.

A concrete example is given using the combination 7. The evaluator 19 refers to the evaluation results for the combination 7 illustrated in FIG. 10 and evaluates each of the phrase pairs 2, 9, and 16 in FIG. 11. Since an English phrase EF4 in the phrase pair 2 consists only of a good morpheme, the phrase pair 2 is evaluated as a good phrase pair. Since an English phrase EF5 in the phrase pair 9 contains the bad morphemes 50b and 50d, the phrase pair 9 is evaluated as a bad phrase pair. Since the phrase pair 16 has no English phrase, the phrase pair 16 is evaluated as a neutral phrase pair.

Figure 12:
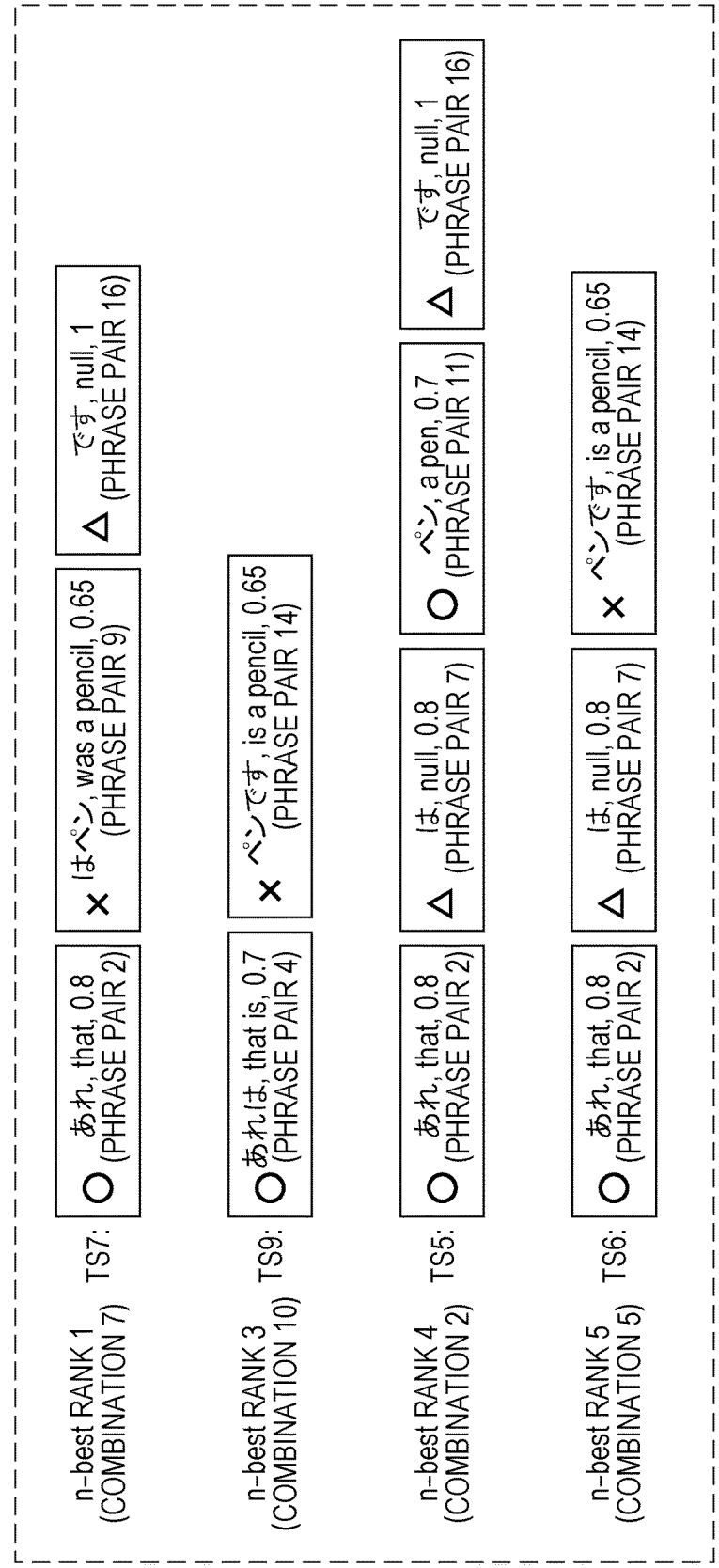
FIG. 12 is a diagram illustrating results of evaluation of the phrase pairs.

FIG. 12 is a diagram illustrating results of the evaluation of the phrase pairs. A good phrase pair is indicated by a circle (○), a bad phrase pair is indicated by a cross mark (×), and a neutral phrase pair is indicated by a triangle (Δ).

Note that the phrase pairs used to generate the candidate target text selected in Step S5 may be evaluated likewise. In this case, all the phrase pairs are evaluated as good phrase pairs.

For example, the following processes are performed for score adjustment of a good phrase pair, a bad phrase pair, and a neutral phrase pair.

<1> The score adjustor 20 increases the score of a good phrase pair by multiplying the score by a predetermined weight. Alternatively, the score adjustor 20 may increase the score of a good phrase pair by adding a predetermined value to the score.

<2> The score adjustor 20 decreases the score of a bad phrase pair by multiplying the score by a predetermined weight. Alternatively, the score adjustor 20 may decrease the score of a bad phrase pair by subtracting a predetermined value from the score.

<3> The score adjustor 20 maintains the score of a neutral phrase pair.

<4> The score adjustor 20 increases the score of a neutral phrase pair in the same way as in <1>.

<5> The score adjustor 20 decreases the score of a neutral phrase pair in the same way as in <2>.

<6> When increasing the score of a good phrase pair according to <1>, the score adjustor 20 decreases the score of a phrase pair containing the same Japanese phrase as the good phrase pair so that their scores add up to 1. For instance, when increasing the score of the phrase pair 2 from 0.8 (FIG. 2) to 0.9, the score adjustor 20 decreases the score of the phrase pair 1 from 0.2 (FIG. 2) to 0.1.

<7> When decreasing the score of a bad phrase pair according to <2>, the score adjustor 20 increases the score of a phrase pair containing the same Japanese phrase as the bad phrase pair so that their scores add up to 1. For instance, when decreasing the score of the phrase pair 9 from 0.65 (FIG. 2) to 0.55, the score adjustor 20 increases the score of the phrase pair 10 from 0.35 (FIG. 2) to 0.45.

The score adjustor 20 adjusts the score of each of the phrase pairs illustrated in FIG. 12 using one or any combination of <1> to <7> (Step S10). This is one type of learning of the translation model 17. The score adjustor 20 may adjust scores using a combination of <1>, <2>, and <3>, only <1>, only <2>, a combination of <1> and <2>, a combination of <1> and <4>, or a combination of <2> and <5>.

The following describes score adjustment in detail using a combination of <1>, <2>, and <3>. In the following, as an example, the predetermined weight is 1.2 for good phrase pairs and 0.8 for bad phrase pairs. Referring to FIG. 12, the score adjustor 20 first adjusts the scores of the phrase pairs 2, 9, and 16 forming the combination 7.

Since the phrase pair 2 is a good phrase pair, the score adjustor 20 increases the score of the phrase pair 2 from 0.8 to 0.96 (=0.8×1.2) in the phrase table 7 in FIG. 2. Since the phrase pair 9 is a bad phrase pair, the score adjustor 20 decreases the score of the phrase pair 9 from 0.65 to 0.52 (=0.65×0.8) in the phrase table 7. Since the phrase pair 16 is a neutral phrase pair, the score adjustor 20 maintains the score of the phrase pair 16 at 1 in the phrase table 7. The cumulative probabilities for the phrase pairs 2, 9, and 16 forming the combination 7 after the score adjustment is 0.4992 (=0.96×0.52×1), which is lower than the original cumulative probability (0.520) illustrated in FIG. 8.

The process in Step S10 may be performed again when the cumulative probability after score adjustment is still higher than the cumulative probability for the phrase pairs forming the candidate target text selected by the user. To be more specific, when the cumulative probability for the phrase pairs 2, 9, and 16 forming the combination 7 after the score adjustment (0.4992) is higher than the cumulative probability for the phrase pairs forming the candidate target text selected in Step S5 (0.490, the cumulative probability of the scores of the phrase pairs forming the combination 9 in FIG. 8), the score adjustor 20 performs the process in Step S10 again with respect to the phrase pairs 2, 9, and 16 forming the combination 7.

The score adjustor 20 performs the score adjustment on the rest of the combinations (the combinations 10, 2, and 5) in the same manner as for the combination 7.

After Step S10, the re-translator 22 retranslates the source text contained in the translation information recorded in Step S3 (that is, the source text inputted in Step S1) in the same manner as in Step S2 (Step S11). The retranslation uses the phrase table 7 updated by the score adjustment. In this retranslation, the re-translator 22 generates retranslation result information (not illustrated) based on candidate target texts generated again. Since the source text is retranslated using the score-adjusted phrase table 7, the retranslation result information may differ from the translation result information 40 in FIG. 8 in the translation-result-related numerical information (the n-best ranks and cumulative probabilities).

The machine translator 14, not the re-translator 22, may perform the process in Step S11 instead. In this case, the translation system 10 is without the re-translator 22.

The translation result comparer 23 compares the n-best ranks in the translation result information 40 in FIG. 8 with the n-best ranks in the retranslation result information, and determines whether there is any change in the n-best ranks (Step S12). A case where there is no change in the n-best ranks is an example of a case where a predefined criterion is satisfied. Instead, the case where the predefined criterion is satisfied may be a case where the n-best rank of the combination 9 in FIG. 8 (that is, the n-best rank of the candidate target text selected by the user in Step S5) does not have the first n-best rank in the retranslation result information, or does have the first n-best rank but the difference between the cumulative probability of the first n-best rank and that of the second n-best rank is a predetermined value or smaller (that is, the difference is slight).

When the translation result comparer 23 determines that there is no change in the n-best ranks (Yes in Step S12), the score readjustment determiner 24 determines to perform score adjustment again (Step S13), and returns to Step S10.

When the translation result comparer 23 determines that there is change in the n-best ranks (No in Step S12), the translation system 10 ends its operation. Although Steps S11 to S13 are performed in the present embodiment, the translation system 10 may end its operations in Step S10.

As described above, the translation system 10 according to the present embodiment can identify phrase pairs used to generate each of candidate target texts generated by the machine translator 14. Thus, based on the candidate target text selected by the user from the candidate target texts, the translation system 10 can adjust the scores of the phrase pairs used to generate the unselected candidate text targets.

A brief description is given of a case where syntactic analysis is used in Step S6. The linguistic processor 21 performs syntactic analysis on each of the five candidate target texts outputted in Step S4 and thereby segments each candidate target text into multiple elements. In syntactic analysis, the elements are, for example, nodes of a tree structure representing a syntax (herein, for example, a subject S, a predicator V, a complement C, an object O, and the like for the sake of simplicity). For instance, the candidate target text TS8 (the combination 9) selected in Step S5 is segmented into "that=S", "is=V", and "a pen=C". As another instance, the candidate target text TS7 (the combination 7) is segmented into "that=S", "was=V", and "a pencil=C".

In Step S7, the evaluator 19 evaluates the elements obtained by the syntactic analysis. For the combination 7 for instance, the evaluator 19 evaluates "that=S" as a good element, "was=V" as a bad element, and "a pencil=C" as a bad element.

Then, in the same manner as in the case of morphological analysis, the evaluator 19 evaluates each of the phrase pairs illustrated in FIG. 11 with respect to adjustment of the score of the phrase pair (Step S9). For the combination 7 for instance, the evaluator 19 evaluates the phrase pair 2 as a good phrase pair, the phrase pair 9 as a bad phrase pair, and the phrase pair 16 as a neutral phrase pair.

Then, in the same manner as in the case of morphological analysis, the score adjustor 20 adjusts the score of each of the phrase pairs evaluated in Step S9 (Step S10). In this score adjustment, when a phrase pair is evaluated as a bad phrase pair as a result of comparison of elements different in types (for instance, "a pen=C" and "a pencil=O"), the score of the phrase pair is changed more greatly than when the elements compared are of the same type (for instance, "a pen=C" and "a pencil=C"). This allows improvement in the learning effect regarding syntax errors.

A modification of the present embodiment is described. In the present embodiment, the predetermined weights used for the score adjustment (Step S10) are fixed values, while in the modification, the predetermined weights are variable values. When the first process (<1> described above) is to be performed to increase the score of a good phrase pair (for instance, the phrase pair 2 in FIG. 2), the weight setter 25 sets the predetermined weight (a first predetermined weight) for use in the first process according to the variability in score between the good phrase pair and another phrase pair containing the same phrase in Japanese (the first language) (the phrase pair 1 in FIG. 2) as the good phrase pair. The variability is, for example, dispersion. Then, the score adjustor 20 increases the score of the good phrase pair using the predetermined weight set by the weight setter 25.

The weight setter 25 sets the predetermined weight so that the score of the good phrase may be changed to a relatively large extent when the variability is relatively large, and sets the predetermined weight so that the score of the good phrase may be changed to a relatively small extent when the variability is relatively small. Conversely, the weight setter 25 may set the predetermined weight so that the score of the good phrase may be changed to a relatively small extent when the variability is relatively large, and set the predetermined weight so that the score of the good phrase may be changed to a relatively large extent when the variability is relatively small.

When the second process (<2> described above) is to be performed to decrease the score of a bad phrase pair (for instance, the phrase pair 9 in FIG. 2), the weight setter 25 sets the predetermined weight (a second predetermined weight) for use in the second process according to the variability in score between the bad phrase pair and another phrase pair containing the same phrase in Japanese (the first language) (the phrase pair 10 in FIG. 2) as the bad phrase pair. The variability is, for example, dispersion. Then, the score adjustor 20 decreases the score of the bad phrase pair using the predetermined weight set by the weight setter 25.

The weight setter 25 sets the predetermined weight so that the score of the bad phrase may be changed to a relatively large extent when the variability is relatively large, and sets the predetermined weight so that the score of the bad phrase may be changed to a relatively small extent when the variability is relatively small. Conversely, the weight setter 25 may set the predetermined weight so that the score of the bad phrase may be changed to a relatively small extent when the variability is relatively large, and set the predetermined weight so that the score of the bad phrase may be changed to a relatively large extent when the variability is relatively small.

The present disclosure is useful in, for example, statistical machine translation.

What is claimed is:

1. A method for performing machine translation using a translation apparatus having a processor, the method comprising:
   receiving, using the processor, a plurality of respective candidate target texts which are generated by translation of a source text in a first language into a target text in a second language different from the first language as candidates for the target text in the second language;
   specifying, using the processor, combinations of phrase pairs used to generate the respective candidate target texts among phrase pairs contained in a phrase table of a translation model, the phrase table stored in a server and containing the phrase pairs each being a pair of a phrase in the first language and a phrase in the second language; and
   recording, using the processor, combination information in the server, the combination information identifying the combinations of phrase pairs,
   wherein the phrase pairs contained in the phrase table of the translation model are respectively associated with scores each of which is information on probability of occurrence of the phrase pair associated therewith,
   the method further comprising:
      prompting a user to select a most suitable candidate target text from the candidate target texts;
      using the recorded combination information, identifying the combination of the phrase pairs used to generate the candidate target text not selected in the selecting;
      evaluating each of the phrase pairs forming the identified combination so as to adjust a score of the phrase pair;
      updating the translation model by learning the adjusted score of the phrase pair; and
      retranslating the source text using the updated translation model.

2. The method according to claim 1,
   wherein the recording includes recording, as the combination information, a data structure representing the combinations of the phrase pairs used to generate the respective candidate target texts, and paths along which the respective combinations of the phrase pairs used to generate the respective candidate target texts are obtainable in the data structure.

3. The method according to claim 1,
   wherein the evaluating includes comparing each of the phrase pairs forming the identified combination with elements of the selected candidate target text, and determining, based on predetermined criteria, to increase the score of the phrase pair whose score is to be increased, and to decrease the score of the phrase pair whose score is to be decreased.

4. The method according to claim 3, further comprising:
   performing processing which is at least one of a first process of increasing the score of the phrase pair whose score is determined to be increased and a second process of decreasing the score of the phrase pair whose score is determined to be decreased.

5. The method according to claim 4, further comprising:
   when the first process is performed in the processing, setting a first predetermined value for use in the first process according to variability between the score of the phrase pair to be subjected to the first process and the score of another phrase pair containing a same phrase in the first language as the phrase pair to be subjected to the first process,
   wherein the performing the processing includes performing the first process using the first predetermined value thus set.

6. The method according to claim 4, further comprising:
   when the second process is performed in the processing, setting a second predetermined value for use in the second process according to variability between the score of the phrase pair to be subjected to the second process and the score of another phrase pair containing a same phrase in the first language as the phrase pair to be subjected to the second process,
   wherein the performing the processing includes performing the second process using the second predetermined value thus set.

7. The method according to claim 4, wherein
the recording includes recording translation-result-related numerical information on the candidate target texts, the translation-result-related numerical information being calculated based on the scores, the method further comprising:
   retranslating the source text using the phrase table in the updated translation model, to generate again a plurality of candidate target texts as candidates for the target text;
   calculating and generating the numerical information on each of the candidate target texts thus generated again, based on the scores in the phrase table updated by the processing;
   determining whether a predefined criterion is satisfied or not based on a comparison between the numerical information recorded and the numerical information generated; and
   performing the processing again when it is determined that the predefined criterion is satisfied.

8. The method according to claim 7, further comprising:
translating a target text from the first language to the second language using the phrase table; and
displaying the translated target text on a display.

9. A translation apparatus comprising:
a recording medium having a phrase table stored thereon, the phrase table containing phrase pairs each being a pair of a phrase in a first language and a phrase in a second language different from the first language;
a processor; and
a memory having a computer program stored thereon, the computer program causing the processor to execute machine translation operations including:
receiving a plurality of respective candidate target texts which are generated by translation of a source text in the first language into a target text in the second language as candidates for the target text in the second language;
specifying combinations of phrase pairs used to generate the respective candidate target texts among phrase pairs contained in a phrase table of a translation model, the phrase table stored in a server and containing the phrase pairs each being a pair of a phrase in the first language and a phrase in the second language; and
recording combination information in the recording medium, the combination information identifying the combinations of phrase pairs,
wherein the phrase pairs contained in the phrase table of the translation model are respectively associated with scores each of which is information on probability of occurrence of the phrase pair associated therewith, and
wherein the machine translation operations further include:
prompting a user to select a most suitable candidate target text from the candidate target texts;
using the recorded combination information, identifying the combination of the phrase pairs used to generate the candidate target text not selected in the selecting; and
evaluating each of the phrase pairs forming the identified combination so as to adjust a score of the phrase pair;
updating the translation model by learning the adjusted score of the phrase pair; and
retranslating the source text using the updated translation model.

10. A translation apparatus comprising:
a processor;
a recording medium having a phrase table stored thereon, the phrase table containing phrase pairs each being a pair of a phrase in a first language and a phrase in a second language different from the first language; and
a medium having a computer program stored thereon, the computer program causing the processor to execute machine translation operations including:
generating a plurality of candidate target texts as candidates for a target text using the phrase table to translate a source text in the first language into the target text in the second language;
specifying combinations of phrase pairs used to generate the respective candidate target texts among phrase pairs contained in a phrase table of a translation model, the phrase table stored in a server and containing the phrase pairs each being a pair of a phrase in the first language and a phrase in the second language; and
recording combination information in the recording medium, the combination information identifying the combinations of phrase pairs,
wherein the phrase pairs contained in the phrase table of the translation model are respectively associated with scores each of which is information on probability of occurrence of the phrase pair associated therewith, and
wherein the machine translation operations further include:
prompting a user to select a most suitable candidate target text from the candidate target texts;
using the recorded combination information, identifying the combination of the phrase pairs used to generate the candidate target text not selected in the selecting;
evaluating each of the phrase pairs forming the identified combination so as to adjust a score of the phrase pair;
updating the translation model by learning the adjusted score of the phrase pair; and
retranslating the source text using the updated translation model.

11. A non-transitory recording medium having a computer program stored thereon, the computer program causing a processor of a translation apparatus to execute machine translation operations comprising:
receiving a plurality of respective candidate target texts which are generated by translation of a source text in a first language into a target text in a second language different from the first language as candidates for the target text in the second language;
specifying combinations of phrase pairs used to generate the respective candidate target texts among phrase pairs contained in a phrase table of a translation model, the phrase table stored in a server and containing the phrase pairs each being a pair of a phrase in the first language and a phrase in the second language; and
recording combination information in the server, the combination information which identifies the combinations of phrase pairs,
wherein the phrase pairs contained in the phrase table of the translation model are respectively associated with scores each of which is information on probability of occurrence of the phrase pair associated therewith, and
wherein the machine translation operations further include:
prompting a user to select a most suitable candidate target text from the candidate target texts;
using the recorded combination information, identifying the combination of the phrase pairs used to generate the candidate target text not selected in the selecting;
evaluating each of the phrase pairs forming the identified combination so as to adjust a score of the phrase pair;
updating the translation model by learning the adjusted score of the phrase pair; and
retranslating the source text using the updated translation model.

* * * * *